(12) United States Patent
Mandanapu et al.

(10) Patent No.: US 8,929,868 B2
(45) Date of Patent: Jan. 6, 2015

(54) SYSTEM AND METHOD TO IDENTIFY AND TRANSFER TO A WIRELESS DEVICE ACTIONABLE ITEMS BASED ON USER SELECTED CONTENT

(75) Inventors: Subash Mandanapu, San Bruno, CA (US); Jean Baptist Chaput, San Francisco, CA (US); Johan Attali, San Francisco, CA (US); Satya Mallya, San Jose, CA (US)

(73) Assignee: France Telecom, Paris (FR)

( * ) Notice: Subject to any disclaimer, the term of this patent is extended or adjusted under 35 U.S.C. 154(b) by 959 days.

(21) Appl. No.: 13/059,970

(22) PCT Filed: Aug. 25, 2009

(86) PCT No.: PCT/IB2009/054059
§ 371 (c)(1),
(2), (4) Date: May 12, 2011

(87) PCT Pub. No.: WO2010/023647
PCT Pub. Date: Mar. 4, 2010

(65) Prior Publication Data
US 2011/0230174 A1 Sep. 22, 2011

Related U.S. Application Data

(60) Provisional application No. 61/091,673, filed on Aug. 25, 2008.

(51) Int. Cl.
*H04W 4/02* (2009.01)
*H04L 29/08* (2006.01)
*H04M 1/725* (2006.01)

(52) U.S. Cl.
CPC ........... *H04L 67/04* (2013.01); *H04M 1/72563* (2013.01); *H04M 1/72583* (2013.01); *H04L 67/1095* (2013.01)
USPC ......... 455/414.1; 370/259; 370/158; 370/157

(58) Field of Classification Search
CPC ................................ H04L 63/08; H04L 67/12
USPC ........................................................ 455/414.1
See application file for complete search history.

(56) References Cited

U.S. PATENT DOCUMENTS 7,200,614 B2 *  4/2007  Reid et al. .............................. 1/1
7,299,414 B2 * 11/2007  Maeno et al. .................. 715/264

(Continued)

FOREIGN PATENT DOCUMENTS

WO           9901831 A1      1/1999

OTHER PUBLICATIONS

SHIFD—Web application, World Wide Web shifd.com/faq, Jul. 25, 2008.

(Continued)

*Primary Examiner* — Lester Kincaid
*Assistant Examiner* — Diego Herrera
(74) *Attorney, Agent, or Firm* — David D. Brush; Westman, Champlin & Koehler, P.A.

(57) ABSTRACT

A system, method, device and interface for selecting data for a wireless device. The system, method, device and interface provide for categorizing selected data based on two or more categories, determining an action based on the categorization, and transferring the selected data and the determined action to the wireless device. In one embodiment, the categorization of the selected data may also be transferred to the wireless device. The categorizing of the selected data may include receiving input related to the categorizing, and altering a categorizing algorithm utilized in performing the categorization in response to the received input. The input may include a new category and/or a change in an existing category.

16 Claims, 6 Drawing Sheets

(56) References Cited

U.S. PATENT DOCUMENTS

| | | | |
|---|---|---|---|
| 2002/0073165 A1* | 6/2002 | McNulty et al. | 709/217 |
| 2005/0198353 A1 | 9/2005 | Zmrzli | |
| 2005/0208930 A1 | 9/2005 | Zmrzli | |
| 2006/0282500 A1* | 12/2006 | Kiuchi et al. | 709/203 |

OTHER PUBLICATIONS

OOMBLE—Web application, World Wide Web oonble.com, Feb. 19, 2011.

* cited by examiner

SYSTEM AND METHOD TO IDENTIFY AND TRANSFER TO A WIRELESS DEVICE ACTIONABLE ITEMS BASED ON USER SELECTED CONTENT

FIELD OF THE PRESENT SYSTEM

The present system relates to at least one of a method, user interface and apparatus for transferring data to a mobile device including an action related to the data.

BACKGROUND OF THE PRESENT SYSTEM

As mobile telephones have become more converged, people are becoming used to using a converged mobile telephone in place of a typical computer system, such as a desktop personal computer, laptop, etc. (generally termed hereinafter, "PC"). However, a problem exists in that users that interact with data on one device, such as the PC, may have a desire to access the same data on the mobile telephone. Further, users are exposed to lots of content, such as when interacting with a web browser, yet no simple system is available that organizes the content and provides for a simplified subsequent interaction with the content on either of the devices. Further, oftentimes, content that is presented in one application, may be desired to be interacted with in another application.

A typical solution for enabling interaction with content on two or more devices is provided by a synchronization application that operates between content stored on the PC and a personal digital assistant (PDA). Synchronization provides for two copies of the data, one copy that is stored on the PC and the other copy that is stored on the PDA. In a case where content is altered on one of the devices, the content is updated on the other of the devices during a subsequent synchronization. This system facilitates having the content available on either of the devices, however does nothing to suitably organize the content on the devices. Generally, the content is added to a given application on one of the devices, such as a phone book application. After synchronization, the content is available in a corresponding phone book application on the other device. The organization of the content is determined by how the content is organized on the device that contains the content prior to synchronization. For example, the iPhone™ by Apple Computer, Inc. allows for transfers of content between a desktop iTunes™ application and the corresponding iTunes application on the iPhone. This system solves the problem of having access to content on each of the devices but provides no help in the organization of content and does not provide for one or more further actions related to the content. Other applications may similarly utilize an Internet connection for synchronization and/or a transfer of content to the mobile telephone.

Another solution provided by U.S. Patent Publication No. US20050198353 to Zmrzli, incorporated herein as if set out in its entirety, shows a method for enabling wireless communications that includes detecting one or more user actions when the user is browsing a web page. In operation, the system may enable selection of one or more content items from the web page based on user interaction with the web page. While the content items may be formatted for and sent to a specific end device, such as a mobile telephone, further actions are not associated with the content items. Internet based solutions provide for selected content to be identified and sent to a Internet based server for access on a PC and mobile telephone, but does not provide for the content to be sent to the mobile telephone and does not provide for actions associated with the content to be sent to the mobile phone.

None of these prior systems provides a system, method, user interface and device to identify and transfer to a wireless device actionable items based on user selected content.

SUMMARY OF THE PRESENT SYSTEM

It is an object of the present system to overcome disadvantages and/or make improvements in the prior art.

The present system includes a system, method, device and interface for selecting data for a wireless device. The system, method, device and interface provide for categorizing selected data based on two or more categories, determining an action based on the categorization, and transferring the selected data and the determined action to the wireless device. The categorizing of the selected data may include receiving input related to the categorizing, and altering a categorizing algorithm utilized in performing the categorization in response to the received input. The input may include a new category and/or a change in an existing category.

Selected data may be analyzed to determine an identifiable pattern in the selected data. The identifiable pattern may be associated with the alteration of the categorization algorithm. Transferring the selected data and the determined action may include transferring the selected data and the determined action to the wireless device via a network source. The wireless device may poll the network source to initiate the transferring. An action on the wireless device may be performed based on the selected data and the determined action. The categorizing of the selected data may include recommending one or more actions based on the selected data.

In a case wherein the selected data is accessed on the wireless device, the system of accessing the selected data may be based on the selected data. Accessing the selected data may include accessing the data, a user determined time after transferring. An action related to applications contained on the wireless device may be processed on the mobile device. An action related to an external device or an external application may be processed based on the selected data from the wireless device. The action and/or the selected data may be stored in a memory of the wireless device. The selected data and the action may be transferred to the wireless device without user intervention. The selected data and the action may be processed on the wireless device without user intervention.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. For example, an operative coupling may include a wired and/or wireless coupling to enable communication between a data server and one or more user devices. A further operative coupling, in accordance with the present system may include one or more couplings between two or more user devices, such as via a network source, such as the data server, in accordance with an embodiment of the present system.

Figure 1:
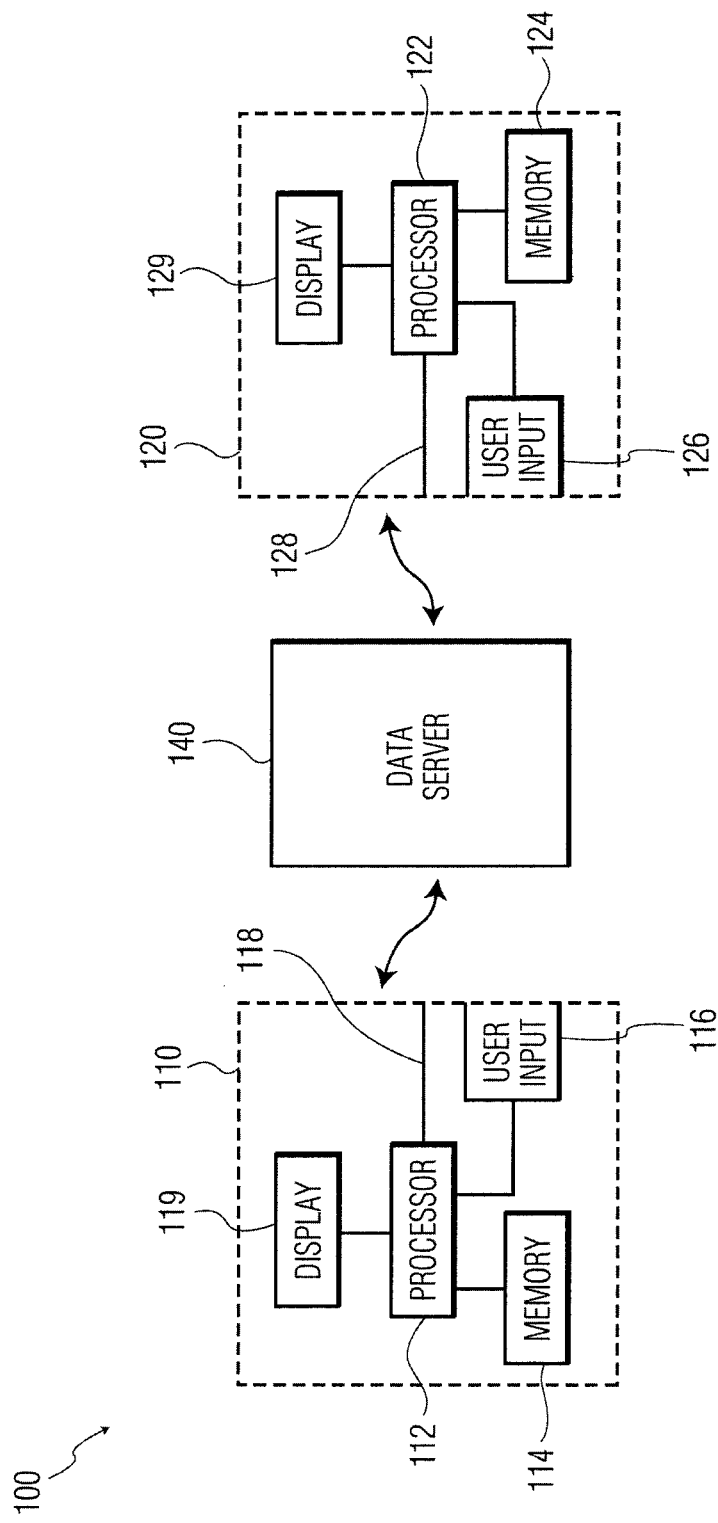
FIG. 1 shows a system including user devices and a data server in accordance with an embodiment of the present system.

FIG. 1 shows a system 100 including user devices 110, 120 and a data server 140 in accordance with an embodiment of the present system. Each of the user devices 110, 120 may include processors 112, 122 operatively coupled to corresponding memories 114, 124, displays 119, 129, user input devices 116, 126 and communication interfaces, illustratively shown as input/output (I/O) devices 118, 128. The I/O devices 118, 128 may provide coupling between portions of the present system and as such, may provide coupling utilizing one or more of radio frequency (RF) coupling, Bluetooth coupling, infrared coupling etc. Further description of these and other interactions including coupling between devices of the system are provided herein. While not shown for purposes of simplifying the following description, it is readily appreciated that the data server 140 may include processors, memories, displays and user inputs similar as shown for each of the user devices 110, 120, as well as other networked servers, such as may host web sites, etc. The memories of each of the devices 110, 120, 140 may contain program portions and other data for configuring respective processors for operation in accordance with the present system. Accordingly, while the following description focuses on details of interaction within components of each of the user devices 110, 120, it should be understood to similarly apply to interactions of components of the data server 140.

The memories 114, 124 may be any type of device for storing programming applications and/or application data, such as to perform acts in accordance with the present system, to support a display and user interface (e.g., UI, graphical user interface (GUI, etc.), etc. The programming application data is received by the processors 112, 122 for configuring the processors 112, 122 to perform operation acts in accordance with the present system. The operation acts may include controlling the corresponding displays 119, 129 to render elements in a form of a UI and/or controlling the displays 119, 129 to render other information in accordance with the present system. In accordance with an embodiment, the memories 114, 124 may be suitably applied to store data, selected data, categories, and/or actions. As such, one or more of the memories 114, 124 may be removable memories that may be removed from a corresponding device and accessed on another device.

The user input devices 116, 126 operate through a suitably configured UI to enable interaction within operations in accordance with the present system, such as to enable web browsing, content selection, such as provided by left and right clicking on a device, such as a computer mouse, drag to select, drag and drop, etc., as may be readily appreciated by a person of ordinary skill in the art. In accordance with an embodiment of the present system, one or more of the displays 119, 129 may operate as a touch sensitive display for communicating with the corresponding processors 112, 122 (e.g., providing selection of a web browser, a Uniform Resource Locator (URL), portions of web pages, etc.) and thereby, the displays 119, 129 may also operate as user input devices. In these ways, a user may interact with corresponding processors 112, 122 including interaction within a paradigm of a UI, such as to support data selection. Clearly one or more of the user devices 110, 120 may all or partly be portions of separate computer systems embedded in portable devices, such as a mobile telephone, personal computer (PC), personal digital assistant (PDA), converged device such as a smart telephone, etc.

The system and method described herein address problems in prior art systems. In accordance with an embodiment of the present system, the user devices 110, 120, corresponding user interfaces and other portions of the system 100 are provided including the user device 110, such as a personal computer (PC), for browsing content, selecting content, identifying an action associated with selected content and for transferring the selected content and associated action to the user device 120 via the data server 140.

Each of the UIs may be provided by an application running on corresponding processors 112, 122, such as part of one or more of the user devices and/or may be provided by an application running on a server device, such the data server 140 accessible to the user devices. The visual environment may be displayed by a processor on a display device and a user may be provided with an input device or system (e.g., touch display screen) to influence events or images depicted on one or more display areas of the user devices 110, 120.

To facilitate manipulation of data (e.g., selection of data within an application, such as an Internet browser), the UI may provide different views that are directed to different portions of the manipulation process. For example, the UI may present a typical GUI including a windowing environment and as such, may include menu items, pull-down menu items, etc., that are typical of those provided in a windowing environment, such as may be represented within a Mac OS X™ Operating System graphical UI as provided by Apple Computer, Inc., such as on a MacBook™, iMac™, an iPhone™, etc. The objects and sections of the UI may be navigated utilizing the user input devices 116, 126, such as a mouse, stylus and/or other suitable user input device. Further, the user input may be utilized for making selections within the UI such as by selection of data, portions thereof, menu items, radio buttons and other common interaction paradigms as understood by a person of ordinary skill in the art.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as one or more of the memories 114, 124 and/or other memory respectively coupled to one of the processors 112, 122.

Figure 2:
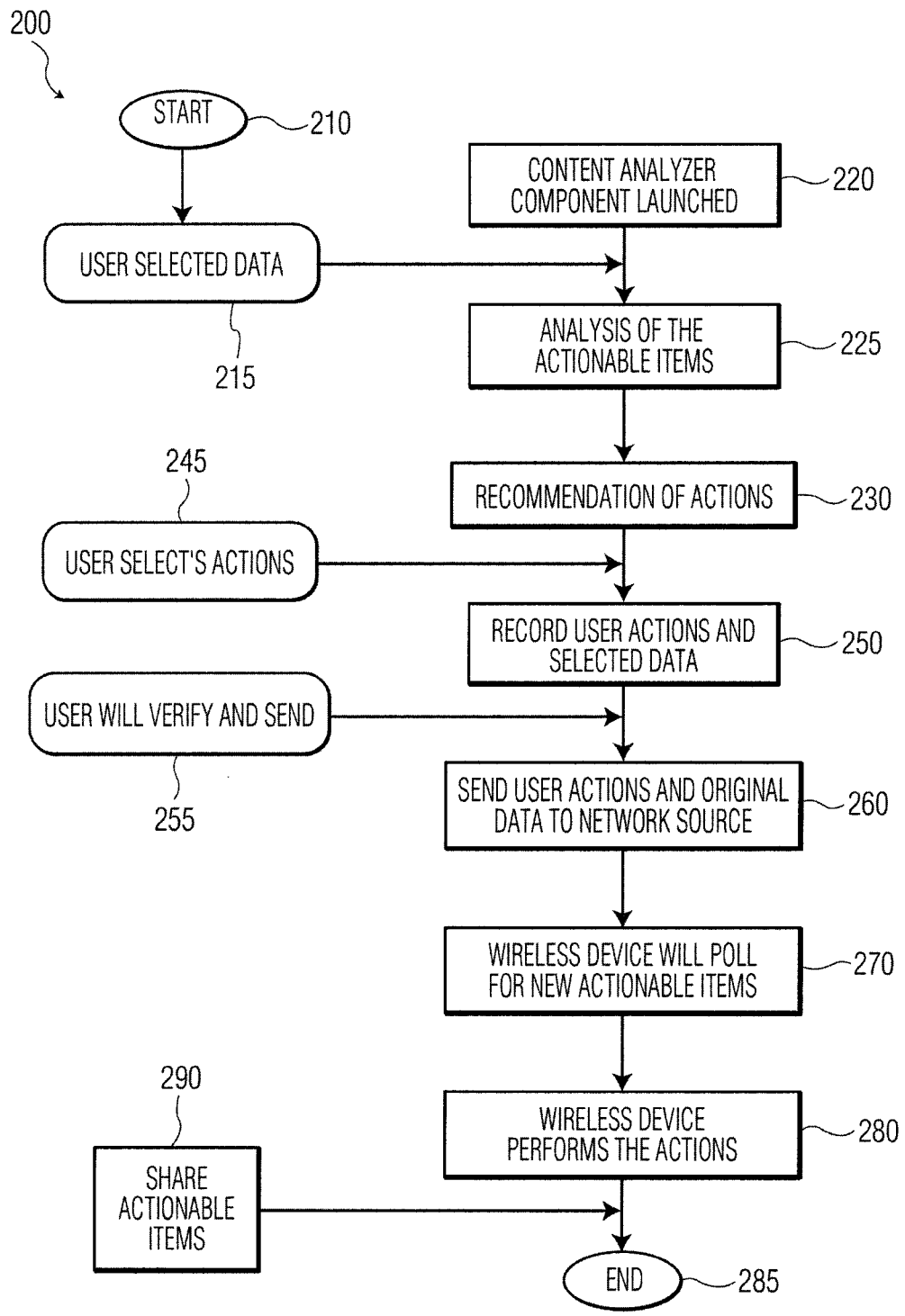
FIG. 2 shows a process flow diagram in accordance with an embodiment of the present system.

FIG. 2 shows a process flow diagram 200 in accordance with an embodiment of the present system. The present process flow diagram provides a system, method, processor, UI, etc. for identifying actionable items for a portable device, such as a mobile telephone, converged device, etc., such as the user device 110 show in FIG. 1 (e.g., PC). In operation, data is selected and the present system recommends one or more actions that may be taken on the portable device, such as the user device 120 shown in FIG. 1 (e.g., a wireless device), based on the user selected data. The user may select the content from a standalone device, such as data present on the user device 110, or a networked source, such as the data server 140. In accordance with the present system, the one or more actions are transferred together with the selected data to the wireless device to enable performance of the one or more actions.

As shown, the process may begin during act 210 which may be the initiation of a browsing operation of data that is present, for example, on the user device 110 and/or the data server 140. As utilized herein, the term "browsing" and formatives thereof, unless specified otherwise, is intended to refer to any operation wherein the user is reviewing data whether it be within an application primarily dedicated to browsing, such as an Internet browser application like the Mozilla Firefox™ web browser, or whether it be within another type of application, application plug-in, widget, etc., such as a word processing application. In accordance with the present system, a user may be assisted through use of the present system regardless of the application or system utilized to present data to the user.

During act 215, a user selection of data in accordance with an embodiment of the present system is performed. As stated above, data may be selected by a user in numerous ways. In accordance with one embodiment of the present system, desired data may be selected by a user using a user input device, such as a computer mouse. For example, the user may position a cursor before a beginning portion of the desired data, left-clicking with a user input, such a left mouse selection button, dragging the cursor through to an end of the desired data and then releasing the left-click (termed "drag to select") as may be provided for selection of data within a typical graphical computer environment as may be readily appreciated by a person of ordinary skill in the art.

Figure 3:
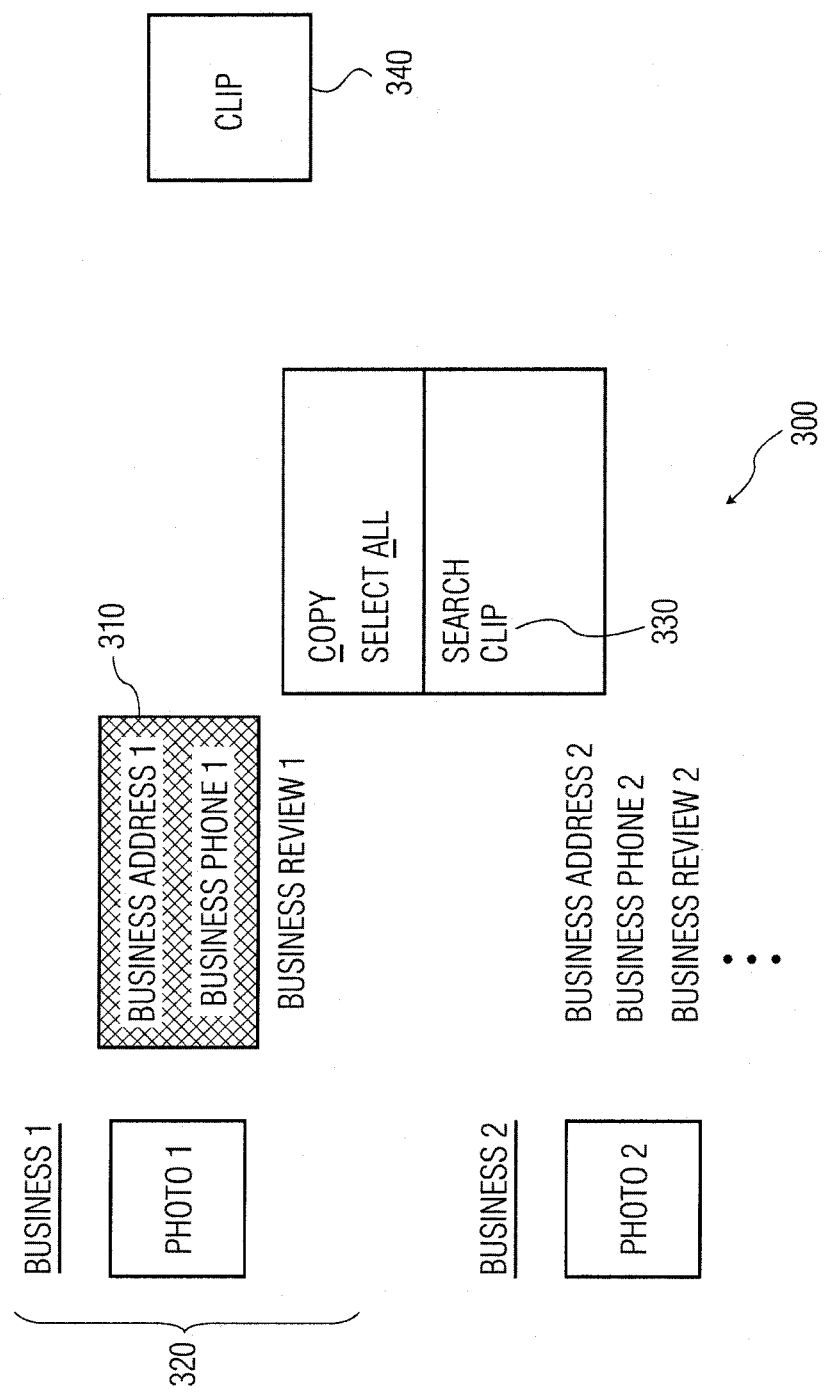
FIG. 3 shows an illustrative user interface in accordance with this embodiment of the present system.

FIG. 3 shows an illustrative UI 300 in accordance with this embodiment of the present system. In FIG. 3, data portion 310 shows a selected data portion of a business listing 320 that may be provided in response to a data query, such as may be provided by an Internet search engine in response to a search query. Other systems for selecting data may be provided such as by double-clicking on a data portion, choosing a menu "selection" item, etc., as may be readily appreciated.

In accordance with the present system, some time before, during, or after data selection, a content analyzer portion of the present system is launched during act 220 as shown in FIG. 2. The content analyzer portion may be initiated by any suitable process, such as a portion of a boot-up procedure of the user device 110, may be initiated in response to selection by the user of an application present on the user device (e.g., such as present on the PC, the application hereinafter termed a "desktop application") may be initiated in response to dropping of selected content onto an iconized representation of the present system, such as an icon 340 provided within the GUI 300 of FIG. 3, which may be rendered on the display 119 of the user device 110, etc.

After the desired data is selected, such as indicated by highlighting, etc., the data is analyzed and categorized during act 225. For example, in operation in one embodiment in accordance with the present system, a right-click on the selected/desired data may produce a pop-up window including menu items typical of a UI generally, however, in accordance with this embodiment, an additional menu item 330 is presented for initiating analysis of the selected data, by a data analysis program portion in accordance with the present system. In another embodiment, a graphical representation of the present system may be provided within the UI 300, such as shown by an iconized graphical representation as indicated by icon 340 in FIG. 3. In this embodiment, the selected data may simply be dragged-and-dropped onto the icon 340 to initiate data analysis in accordance with the present system. Naturally other systems for selection and initiation of analysis/categorization of selected data would readily occur to a person of ordinary skill in the art and are intended to be encompassed by the present system.

In accordance with one embodiment of the present system, analysis/categorization of selected data may include an analysis algorithm including recognition of common patterns in the selected data. For example, portions of the selected data may be analyzed to identify strings of data that may be common to telephone numbers. In one embodiment, data analysis may include a search through the selected data for data corresponding to a telephone number. For example a search may include searching for a string of ten (10) numbers that may be broken into a pattern of three (3) numbers with a separator (e.g., a beginning and/or ending parenthesis), followed by three (3) further numbers, a further separator (e.g., a hyphen) and ending in four (4) further numbers. A search for a URL present in the selected data may include a search for common URL portions such as "WWW", ".com", other three letter extensions following a period, etc. Addresses present in selected data may be identified as beginning with a number string, having a name/number component and ending in words such as "street", "road", "avenue", "boulevard" and/or common abbreviations thereof. Names that are present in the selected data and that have not been recognized as being a portion of another recognized data category, such as an address, may be identified as a name portion by a comparison to common names and thereby be categorized as such by the present system. In accordance with an embodiment of the present system, portions of selected data that may also be identified and categorized as a note portion of the selected data and/or portions of the selected data not categorized as being a portion of another identified category of data, may by default be identified as a note portion of the selected data. In this way, each portion of the selected data may be analyzed and categorized as belonging to an identified category of data. In one embodiment of the present system, all selected data need not be categorized. For example, in one embodiment of the present system, data not otherwise categorized may be ignored or may be provided to the user to determine categorization of the data or a determination to not categorize the data. Naturally other categories of selected data portions may be similarly recognized, such as email addresses, etc. Further, each category corresponding to portions of the selected data may be altered by the user as described further herein.

In a further embodiment, wherein a selected data portion is identified as a given category of data or is identified by a default action as corresponding to a note category of data or is otherwise uncategorized and the user chooses to alter or provide a suggested category of the selected data portion, the desktop application may perform a further analysis of the selected data portion to identify characteristics of the selected data portion to identify features of the selected data portion that may be utilized to recognize this category of data if other (later) selected data portions exhibit similar characteristics. For example, a selected data portion may be identified as a note category of data but the user may choose to add a category of "birthday" and may associate the selected data portion to the birthday category. In this embodiment of the present system, the desktop application may identify the word birthday in the selected data portion in proximity to a date in the selected data portion and thereby, update a category analysis algorithm to include a category of birthday and utilize a recognition of the word birthday in proximity to a date as portion of the identification algorithm to identify this category of data. In addition, based on a selected action by the user for this selected birthday data, the desktop application may associate the selected action as a recommended action (see act 230 below) if subsequent selected birthday data is identified.

During act 230, based on the identified categories of the one or more portions of the selected data, the present system makes corresponding recommendations of actions, corresponding to actions on the user device 120, such as a wireless device (e.g., mobile telephone), for each of the one or more portions of the selected data. In one embodiment of the present system, as each of the suggested actions correspond to an action on the wireless device, it is advantageous if the desktop application of the present system has information related to applications and operation of the wireless device, such as information related to a wireless data carrier, wireless device brand, operating system, wireless device applications present on the wireless device, etc. In this way, the suggested actions may be directly related to these elements of the particular wireless device of the user. For example, for a data portion identified as a telephone number, a recommended action may be initiating a telephone call on the user's wireless device, such as a mobile telephone, to the identified telephone number. For a data portion identified as being an address, a recommended action may be to launch a web browser on the wireless device and initiate a mapping look-up of the identified address. For a wireless device that has a global positioning satellite receiver (GPS receiver), a suggested action for an address may include performing an Internet search on the wireless device for driving directions from a current location of the wireless device to the identified address. For a data portion identified as a URL, the suggested action may be to launch a web browser on the wireless device that is directed to the identified URL. In accordance with an embodiment of the present system, each category of data may have a corresponding default action associated therewith. In one embodiment, the user may review and modify one or more of the default actions such that a user determined default action is suggested for one or more given categories of identified data in place of a system determined default action.

In any event, during act 245, the user may be provided an opportunity to review the recommended categories and/or actions associated with the selected data and to accept the recommended categories and/or actions and/or to change one or more of the recommended categories and/or actions. For example, for a selected data portion that corresponds to an address, a recommended action may be to launch a browser on the wireless device and perform a mapping operation for the address. However, during the user's review of actions, the user may decide that the address should be added to a calendar application present on the wireless device to identify an address of an appointment of the user. Accordingly, the user may during review of suggested actions, categories, etc, change one or more of the suggested actions, categories, etc., to other actions, categories, etc, that are desired by the user.

After the user selects the action(s) and/or categories that the user wishes to have associated with the selected data, the desktop application records the actions, categories and the corresponding selected data during act 250. Thereafter, during act 260, the desktop application in accordance with the present system sends one or more of the actions, categories, and corresponding selected data to a data server, such as the data server 140 shown in FIG. 1. In another embodiment of the present system, the user may verify and purposeful transmit the one or more of the actions, categories, and corresponding data to the data server during act 255. In one embodiment, the sending of the one or more of actions, categories, and corresponding selected data to the data server may occur without further user intervention. For example, after the user approves/changes the suggested actions, categories, etc., the desktop application in accordance with an embodiment of the present system, may thereafter send the one or more of actions, categories, etc., and corresponding selected data to the data server without further user intervention. In a further automated system in accordance with an embodiment of the present system, act 255 may be omitted altogether and after data is selected by the user, the data may be analyzed, categorized, provided associated actions and all sent to the data server without further user intervention. In one embodiment, the determination of whether there be user intervention may be provided as a user selectable option.

In any event, the one or more of selected data, categories, etc., and the corresponding actions are stored on the data server and are subsequently transferred to the wireless device. In one embodiment of the present system, one or more of an application, widget, plug-in, etc. (hereinafter, "mobile application"), present on the wireless device may initiate a polling of the data server for the selected data, categories, etc., and corresponding actions during act 270. The polling of the data server may be provided as a typical polling as performed, for example, by a mobile telephone during typical operation or it may be a polling that is particularly initiated by the mobile application. In another embodiment, the data server may operate to push and/or otherwise transfer the selected data and corresponding actions to the wireless device.

After the selected data and corresponding actions are received by the wireless device, the wireless device may store the selected data and corresponding actions. In one embodiment of the present system, the wireless device may thereafter during act 280, perform one or more of the corresponding actions in accordance with the selected data. For example, a receipt by the wireless device of data corresponding to a telephone number with a corresponding action of making a telephone call, may result in the wireless device placing a call, such as over a cellular network, WiFi network (e.g., Internet based, such as per-to-peer, etc.) to the telephone number. Similarly, other actions may be initiated in response to other categories of selected data as described above, such as an action of launching a mapping program in response to a selected data portion that corresponds to an address, etc. In accordance with an embodiment of the present system, the wireless device may simply store the selected data and corresponding actions awaiting selection by a user to initiate one or more of the corresponding actions.

In a further embodiment, one or more selected data portions may have two or more corresponding associated actions. For example, a selected data portion corresponding to an address may have one associated action to launch a mapping program and may have a second associated action to launch an address book application resident on the wireless device wherein the address is automatically added to the address book. In an embodiment wherein an action is to launch an address book and/or other associated wireless device application, either as a sole associated action or as one of two or more associated actions in response to selected data, such as selected address data, selected name data, selected telephone data, selected URL data, selected note data, and/or other category of selected data, one or more portions of the selected data may have a same one or more associated actions. For example, wherein selected data is identified to have two or more identified categories of name data, address data, telephone number data, email address data, URL data, memo data, etc., two or more of the identified categories may have a same action associated therewith, such as an action to launch an address book application on the wireless device wherein the corresponding associated data portions are added to a single entry in the address book application. As may be readily appreciated, in accordance with the present system, each selected data portion may be readily added to corresponding categories of data in the wireless device application, such as the address book application. For example, selected name data may be automatically added to name the entry in the address book application, while selected address data is added to to corresponding address portions, such as street address, city, state, zip code, country, etc. Selected email data may be added to corresponding email address portions, etc., of the address book entry. In this way, a simplified means of adding selected data to the wireless device and a corresponding wireless device application is provided wherein prior systems, each portion of selected data needed to be separately added in separate actions, such as separate cut and paste actions.

In accordance with an embodiment of the present system, the user may decide during act 290 to share one or more of the selected data, categories, etc., and the corresponding actions with a further device (e.g., a device such as the device 120, however, other than the user device discussed above). In this way, the user may distribute the one or more of the selected data, categories, etc., and the corresponding actions to the further device which may be a device of a third party, such as a spouse, friend, associate, etc. For example, in a case wherein selected data is categorized as calendar, the user may share the calendar data with a spouse to coordinate appointments there between. In accordance with a further embodiment, the shared data may be appended with an indication as to the user who shared the data with the further device. The user may select to share given categories of data automatically with the further device and/or given selected data may be specifically shared by the user selection within one or more of the desktop application and the mobile application. Sharing may occur directly between devices, such as over a local connection between devices (e.g., wired, wireless, such as infrared, Bluetooth, etc., including peer-to-peer, etc.), may be enabled through the data server, and/or may be enabled through use of a server that operates particularly to support a social network. Thereafter, the process may end during act 285.

Figure 4:
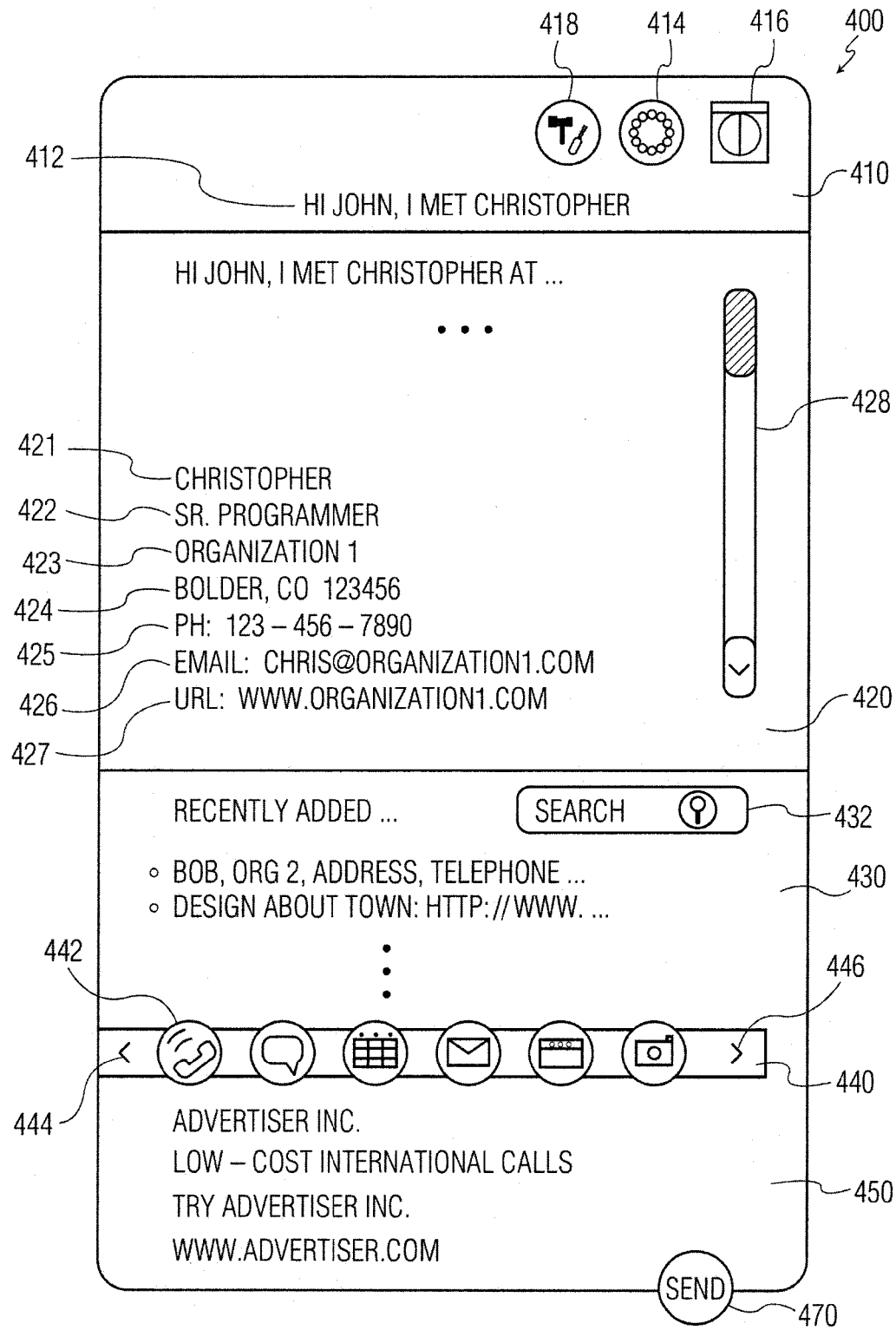
FIG. 4 illustrates parts of a user interface that may be rendered on a desktop device by a desktop application in accordance with an embodiment of the present system.

FIG. 4 illustrates parts of a user interface (UI) 400 that may be rendered on a desktop device, such as a PC, by a desktop application in accordance with an embodiment of the present system. The UI 400 may be provided to facilitate a review/change of selected data, identified categories and corresponding actions. The UI 400 is illustratively shown including selected data. The UI 400 may include one or more of a heading part 410, a selected data part 420, a history part 430, an action part 440 and an advertising part 450. As may be readily appreciated, other parts of the UI 400 may be added, deleted and/or changed at a desire and/or convenience of the user as may operation of the desktop application generally. To facilitate alterations to the UI 400 and/or the desktop application in accordance with the present system, a selection item illustratively shown as icon 418 is provided. In operation, a user selection of the icon 418 may enable the user to alter aspects of the UI 400, such as layout aspects (e.g., changing of a position, naming, rendered images, such as icons, etc., and/or may enable changing parts of the desktop application operation, such as categories of selected data, actions associated with identified categories of selected data, etc.

The heading part 410 provides for a general naming of one or more portions of the selected data (e.g., all of a given selected data), such as a name 412 as shown to facilitate retrieval of the one or more portions of the selected data within the desktop application as well as on a wireless device application. In accordance with an embodiment of the present system, while one or more portions of the selected data may have separate actions associated therewith, all of the given selected data may be retrieved collectively in either or both of the desktop application and the wireless device application by reference to the heading part 410. For example, a first portion of the selected data may have an associated action to add the first portion of the selected data to a calendar application present on the wireless device and a second portion of the selected data may have an associated action to add the second portion of the selected data to an address book application present on the wireless device. By providing a common name to each of the first and second portions of the selected data, the first and second portions of the selected data may be retrieved collectively in either or both of the desktop application and the wireless device application even though on the wireless device, each of the first and second portions of the selected data may also be available within different wireless device applications, such as separate calendar and address book applications. In accordance with the present system, the name 412 provided in the heading part 410 may be derived from the selected data in numerous ways, such as by selecting a given number of words that occur in a beginning portion of the selected data as the name 412. In another embodiment, one or more recognized names present in the selected data may be utilized as the name 412. As may be readily appreciated the name 412 may also be reviewed and/or changed as the user desires. Other systems for deriving a name 412 for the selected data would readily occur to a person is of ordinary skill in the art and accordingly, may also be suitably applied in accordance with the present system.

Within the rendering of the UI 400, the selected data part 420 may provide for a listing of all of the given selected data. Illustratively, the selected data may include identified categories of data portions such as a name part 421, a title part 422, an organization part 423, an address part 424, a telephone number part 425, an email address part 426, a URL part 427, etc. Within the selected data part 420, a slider 428 may be provided in a case wherein rendering of the selected data exceeds a display area available for rendering the selected data as may be readily appreciated by a person of ordinary skill in the art. In one embodiment in accordance with the present system, recognized portions of the selected data, as for example determined during act 225 shown in FIG. 2, may be provided in the selected data part 420 as highlighted, and/or other visually distinctive renderings, such as in a different color than non-recognized portions, to indicate to the user that those portions are recognized and are provided with corresponding associated actions by the present system.

The history part 430 may provide a listing of recently added (selected) data. To facilitate a review of previously selected data, a search part 432 may be provided to enable a search for one or more elements present in the previously selected data. An actions part 440 may provide a listing of actions available for selected data and also may act to filter out a display of selected data to include only selected data that has a corresponding associated action. For example, selection of an icon 442 (e.g., left-clicking on the icon 442), illustratively depicting a calling action, may provide a listing of selected data that is associated with the calling action, such as a listing of telephone numbers previously selected and provided an associated calling action. In accordance with a further embodiment of the present system, a cursor placement over and/or in proximity to a portion of the selected data rendered in the selected data part 420, in response to user interaction with a user input device, such as a mouse, may result in an identification of the associated action for the portion of the selected data. For example, a position of the cursor over the telephone number part 425, may result in a change in a rendering of a depiction of an action representation associated with the telephone number part 425, such as the icon 442. Illustratively, the icon 442 may change color, size, shading etc., to indicate that the telephone number part 425 is associated with the action represented by the icon 442, such as an action for the wireless device to place a telephone call to the number depicted in the telephone number part 425.

In accordance with an embodiment of the present system, selection of a selected data portion provided in the selected data part 420, such as provided by a left-click of a mouse button when a corresponding cursor is over or in proximity to the selected data portion, may similarly provide an indication in the actions part 440 of the corresponding action associated with the selected data portion provided in the selected data part 420. However, in accordance with a further embodiment of the present system, the user may be enabled by the desktop application to select another action or an additional action for the selected data portion provided in the selected data part 420 by thereafter selecting (e.g., left-clicking) a different or additional action provided in the action part 440. For example, the user may decide that it is desired that the telephone number provided in the telephone number part 425 have an action of being added to an address book application present on the wireless device, in place of or in addition to the action to place a telephone call to the telephone number. In operation, after selection of the telephone number provided in the telephone number part 425, the user may left-click on another action depicted in the action part 440 to add a further associated action, or may double left-click on the other action depicted in the action part 440 to replace the previously associated action.

An icon 470 is provided for the user to approve sending the selected data, identified categories and corresponding actions from the PC to the data server, for example as described above regarding act 245 depicted in FIG. 2. By providing the icon 470 and related operation of the desktop application, the user may control whether the selected data is saved on the PC and/or the wireless device. For example, in accordance with an embodiment of the present system, selected data may be automatically saved on the desktop application in response to selecting the data, however, the selected data may only be transferred to the data server and saved to the wireless device, in response to the user clicking-on the icon 470.

The advertising part 450 is illustratively provided within the UI 400 to enable rendering of advertising within the UI 400. In accordance with an embodiment of the present system, the data server, such as the data server 140 shown in FIG. 1, may push, transfer during polling, and/or otherwise transfer advertising to one or more of the PC (e.g., the user device 110) for rendering by the desktop application and/or to the wireless device (e.g., the user device 120) for rendering by the wireless application. In accordance with an embodiment of the present system, the advertising provided may be selected by the data server based on business considerations (e.g., based on requirements provided by the advertisers) and/or may be based on actions, content, data type, data source, etc., associated with selected data portions and/or user device characteristics (e.g., the user device 120 shown in FIG. 1), such as rendering capability (e.g., display, audio, etc., rendering capability). For example, the UI 400 is illustratively shown including a telephone number data portion depicted in the telephone number part 425. Accordingly, a data server in accordance with the present system may analyze the selected data, analyze corresponding actions, etc., to select a related advertisement, such as an advertisement related to telephone service for transferring to and rendering by the desktop application and/or the wireless device application. In an embodiment, the data server may provide targeted content, such as advertisements, coupons, etc., that may be based on user selected data. For example, in a case wherein the selected data relates to a fast food vendor, the data server in accordance with the present system may provide to the advertising part 450, a coupon that may be rendered (e.g., on the display 129) and redeemed at one or more of the fast food vendors establishments. Particular locations may be selected for restrictions where the coupon may be redeemed based on location data associated with the selected data. In another embodiment, data may be provided, such as advertising, coupons, etc., that is related to competitors of the fast food vendor related to the selected data. As may be readily appreciated, other forms of data may be provided in accordance with the present system.

Figure 5:
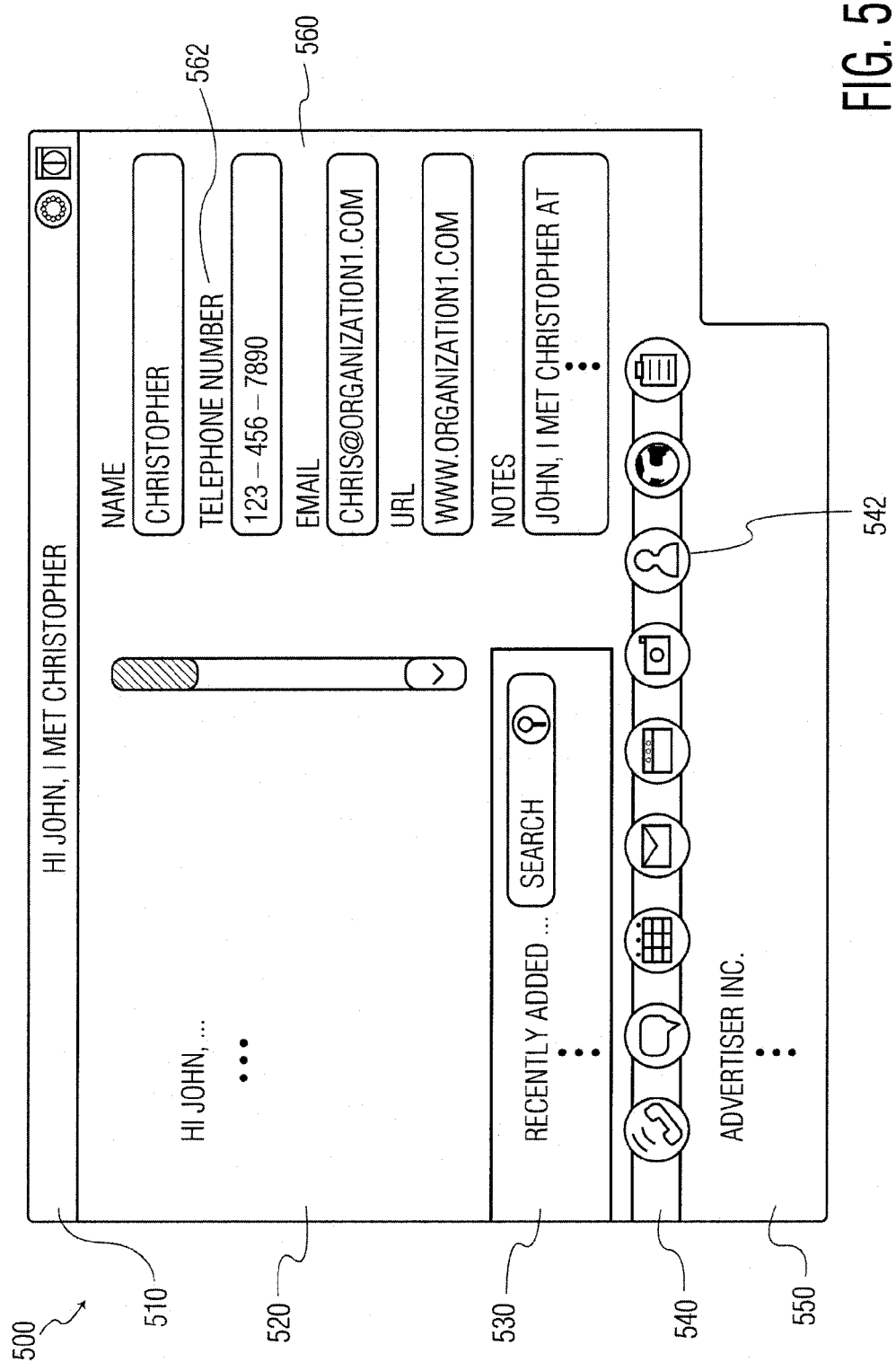
FIG. 5 illustrates parts of an expanded user interface that may be rendered on a desktop device by a desktop application in accordance with an embodiment of the present system.

In accordance with an embodiment of the present system, the UI 400 may be provided with a selection item 414 to enable rendering of an expanded UI. FIG. 5 illustrates parts of an expanded UI 500 that may be rendered on a desktop device by a desktop application in accordance with an embodiment of the present system. The UI 500 is illustratively shown including selected parts that are similar to parts shown within the UI 400 of FIG. 4 and as such, these parts will not be further described herein. The UI 500 additionally has an identified data part 560 wherein portions of the selected data that are rendered in a selected data part 520 that are categorized by the present system, are provided within the identified categories as indicated by a category name, such a category name 562 (e.g., telephone number). As may be readily appreciated, selection of a data portion within the identified data part 560, may result in an indication of the associated action(s) in an action part 540 and may provide for a user initiated change in the associated action(s) similar as described herein for selected data portions depicted in the selected data part 420 (shown as a selected data part 520 within FIG. 5). As may be readily appreciated, the action part may also be expanded to include further actions available as indications, filters, etc. In accordance with an embodiment, a share icon 542 may be provided to facilitate sharing of the one or more of the selected data, categories, etc., and the corresponding actions as described above.

It should be noted that although the UIs 400 and 500 are illustratively described herein as being rendered by the desktop application, the same or similar UIs may be provided by the wireless device application in accordance with an embodiment of the present system. However, in a further embodiment of the present system, the UI rendered by the wireless device application may be visually and/or technically simpler than the UI rendered by the desktop application, for example to reduce demands placed on the processor, display, etc. of the wireless device.

Figure 6:
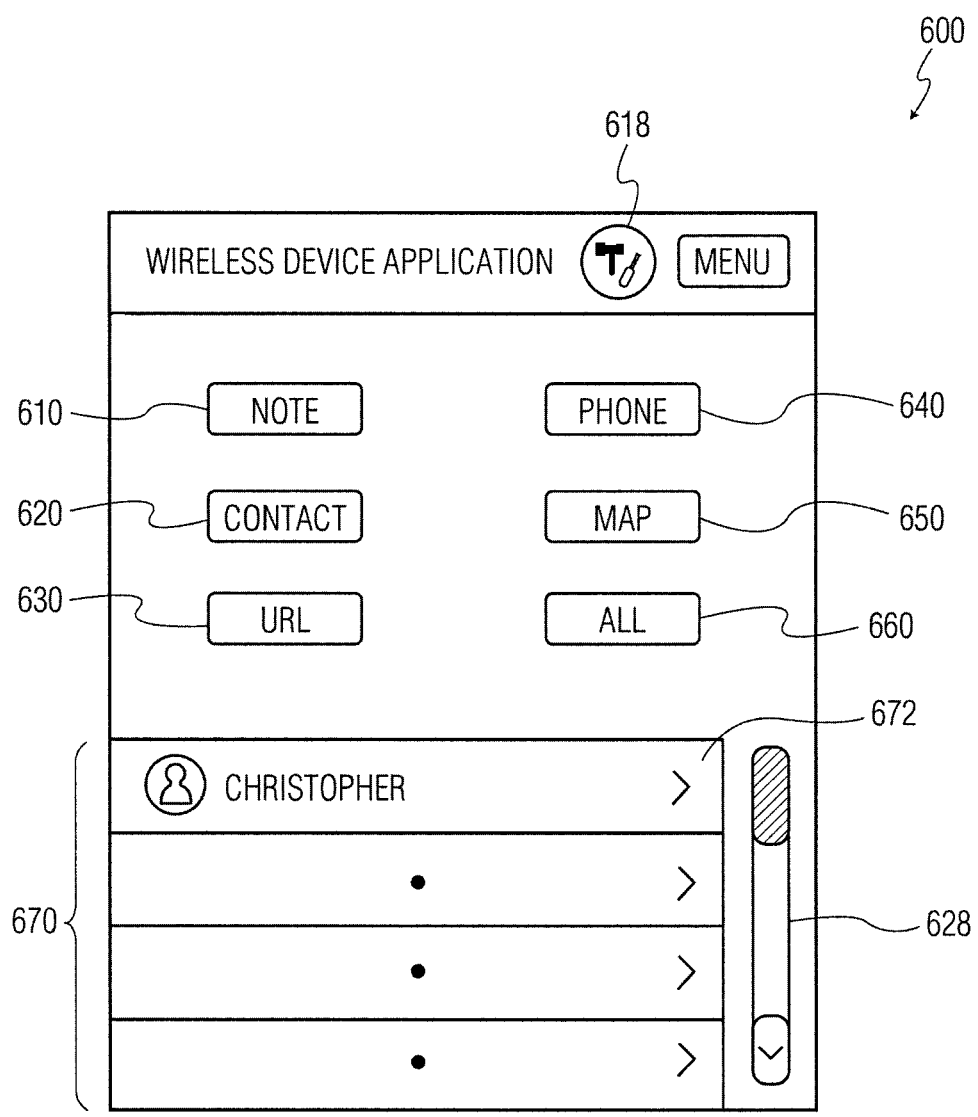
FIG. 6 illustrates parts of a user interface that may be rendered on a wireless device by a wireless device application in accordance with an embodiment of the present system.

FIG. 6 illustrates parts of a user interface (UI) 600 that may be rendered on a wireless device by a wireless device application in accordance with an embodiment of the present system. The UI 600 includes selectable radio button features (hereinafter, "button(s)") as may be typically rendered in a UI. Illustratively, the UI 600 includes a Note Button 610, a Contact Button 620, a URL Button 630, a Phone Button 640, a Map Button 650 and an All Button 660. In accordance with the present system, the buttons 610, 620, 630, 640, 650 may operate similar to the icons provided in the action part 440 of the desktop application. As such, the buttons 610, 620, 630, 640, 650 may operate to filter selected data such that only selected data having actions that correspond to a selected button is rendered in a part 670 of the UI 600. A scroll bar 628 may be provided to scroll through all selected data that has an associated action that corresponds to the selected button. As may be readily appreciated, selection of a button may also initiate rendering of a further UI, wherein only selected data having actions that correspond to a selected button is rendered in the UI. The UI 600 further includes action elements 672 that may be selected to perform an action associated with the listed selected data portions. For example, selection of an action element that is associated with a selected data portion may operate to initiate a corresponding action on the wireless device, such as initiating a web browser to perform an Internet based mapping procedure.

Finally, the above discussion is intended to be merely illustrative of the present system and should not be construed as limiting the appended claims to any particular embodiment or group of embodiments. Thus, while the present system has been described with reference to exemplary embodiments, including user interfaces for each of the desktop application and the wireless device application, it should also be appreciated that numerous modifications and alternative embodiments may be devised by those having ordinary skill in the art without departing from the broader and intended spirit and scope of the present system as set forth in the claims that follow. For example, while the present system has been generally described with regard to the wireless device such as a mobile telephone, it should be understood that any mobile device of the user that is capable of performing the acts described herein may be readily used in accordance with the present system. Further, while exemplary user interfaces are provided to facilitate an understanding of the present system, other user interfaces may be provided and/or elements of one user interface may be combined with another of the user interfaces in accordance with further embodiments of the present system.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method of selecting data for a wireless device, the method comprising acts of:
categorizing selected data based on two or more categories;
determining an action based on the categorization;
transferring the selected data and the determined action to the wireless device;
receiving input related to the categorizing; and
analyzing the selected data to determine an identifiable pattern in the selected data; and
altering a categorizing algorithm utilized in performing the act of categorizing in response to the received input, the alteration of the categorization algorithm being associated with the identifiable pattern.

2. The method of claim 1, wherein the input comprises a new category.

3. The method of claim 1, wherein the input comprises a change in an existing category.

4. The method of claim 1, wherein the act of transferring comprises transferring the selected data, the determined action and the categorization of the selected data to the wireless device via a network source.

5. The method of claim 4, wherein the act of transferring comprises polling the network source.

6. The method of claim 1, comprising an act of performing an action on the wireless device based on the selected data and the determined action.

7. The method of claim 1, wherein the categorizing of the selected data comprises an act of recommending one or more actions based on the selected data.

8. The method of claim 1, comprising an act of a user accessing the selected data on the wireless device, wherein a system of accessing the selected data is determined based on the selected data.

9. The method of claim 8, wherein the act of accessing the selected data comprises an act of accessing the data, a user determined time after transferring.

10. The method of claim 1, comprising an act of at least one of processing on the mobile device, an action related to applications contained on the wireless device, processing of an action related to an external device and processing of an action related to an external application based on the selected data from the wireless device.

11. The method of claim 1, comprising an act of storing at least one of the action, the categorization of the selected data and the selected data in a memory of the wireless device.

12. The method of claim 1, comprising an act of automatically transferring the selected data, the categorization of the selected data and the action to the wireless device without user intervention.

13. The method of claim 1, comprising an act of automatically processing the selected data and the action on the wireless device without user intervention.

14. The method of claim 1, wherein the wireless device is a first wireless device, the method comprising an act of sharing at least one of the selected data, the categorization and the action to a second wireless device.

15. A non-transitory computer readable memory medium comprising a computer program stored thereon, the computer program configured for selecting data for a wireless device when executed by a processor, the computer program comprising the following acts performed by the processor:
- a program portion configured to categorize selected data based on two or more categories;
- a program portion configured to determine an action based on the categorization; and
- a program portion configured to transfer the selected data, the categorization and the determined action to the wireless device, the program portion configured to categorize selected data comprising:
- a program portion configured to receive input related to the categorizing;
- a program portion configured to analyze the selected data to determine an identifiable pattern in the selected data;

the program portion configured to categorize selected data comprising:
- a program portion configured to receive input related to the categorizing;
- a program portion configured to analyze the selected data to determine an identifiable pattern in the selected data;
- a program portion configured to alter a categorizing algorithm utilized in performing the categorization in response to the received input, the alteration of the categorization algorithm being associated with the identifiable pattern.

16. The non-transitory computer readable memory medium of claim 15, wherein the program portion configured to categorize the selected data comprises a program portion configured to recommend one or more actions based on the selected data.

* * * * *